INVENTOR.
JOHN W. HAANSTRA
BY: John B. Aponsle
AGENT

Jan. 16, 1962 J. W. HAANSTRA 3,017,098

ADDING DEVICE

Filed Sept. 7, 1954 7 Sheets-Sheet 2

Jan. 16, 1962 J. W. HAANSTRA 3,017,098

ADDING DEVICE

Filed Sept. 7, 1954 7 Sheets-Sheet 3

Jan. 16, 1962 J. W. HAANSTRA 3,017,098

ADDING DEVICE

Filed Sept. 7, 1954 7 Sheets-Sheet 5

United States Patent Office 3,017,098
Patented Jan. 16, 1962

3,017,098
ADDING DEVICE
John W. Haanstra, San Jose, Calif., assignor to International Business Machines Corporation, New York, N.Y., a corporation of New York
Filed Sept. 7, 1954, Ser. No. 454,255
1 Claim. (Cl. 235—172)

The present invention appertains generally to devices for adding and relates more particularly to adders utilizing analog techniques wherein the analog of each digital order of a number is computed independently.

A copending application, Ser. No. 410,539, filed Feb. 16, 1954, illustrates a further modification in applying analog devices of this kind to adding and multiplying machines.

One object of the present invention is to provide an improved analog adding device.

Analog adders are simple and inexpensive as compared with digital machines, but, as they are now known, they lack the accuracy of digital machines and give, at best, only an approximation of the correct answer. It is therefore another object of this invention to provide an adder which has the simplicity of an analog device but which retains the accuracy of a digital machine.

A further object is to provide an analog adder which utilizes analog techniques only within limits which yield the desired accuracy.

Still another object is to provide an analog adder wherein addition is accomplished serially, i.e., wherein each order of two numbers to be totaled is added separately and sequentially.

Other objects of the invention will be pointed out in the following description and claim and illustrated in the accompanying drawings, which disclose, by way of example, the principle of the invention and the best mode which has been contemplated of applying that principle.

FIGS. 2*a* through 2*d* comprise a detailed block diagram of the novel adder.

FIGS. 3 through 11 comprise detailed circuit diagrams of the various blocks illustrated in FIGS. 2*a* through 2*d*.

Figure 12:
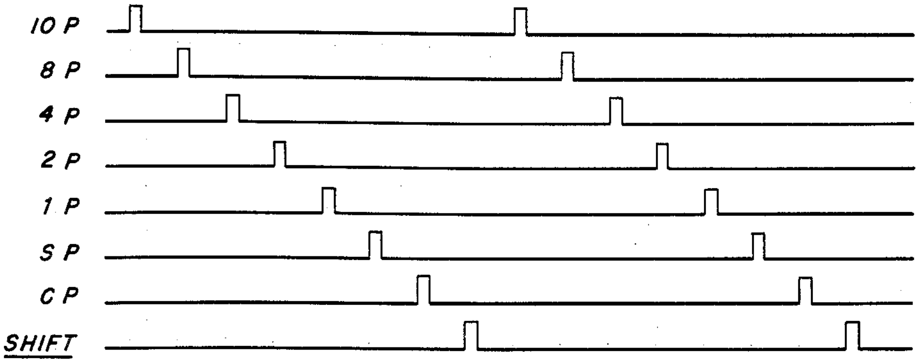

FIG. 12 is a diagrammatic representation of the various signal voltages utilized during the operation of the device.

Figure 1:
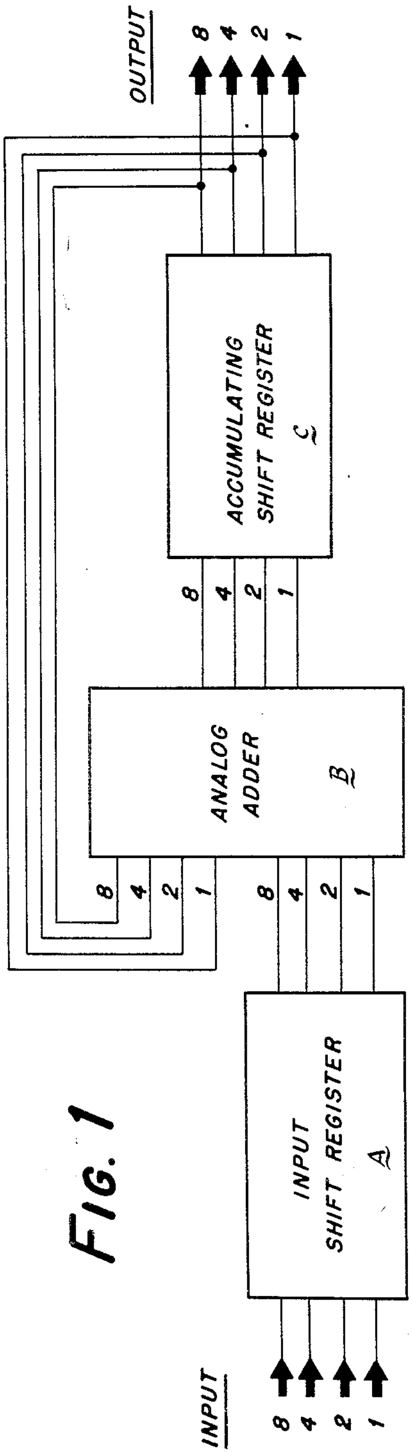
FIG. 1 is a simplified block diagram of the adder of the invention.
Figure 2:
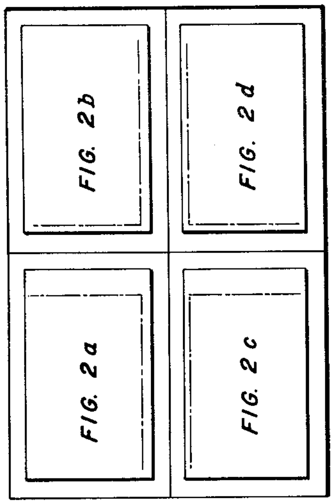
FIG. 2 illustrates the layout of FIGS. 2*a* to 2*d* inclusive.
Figure 3:
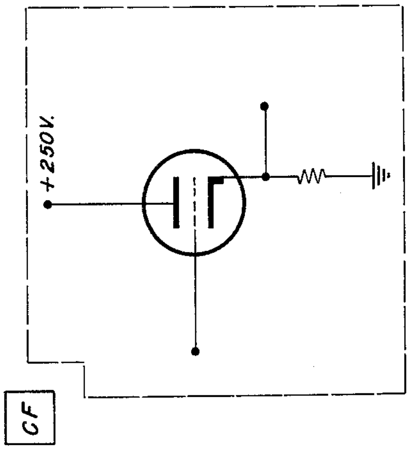
Figure 2A:
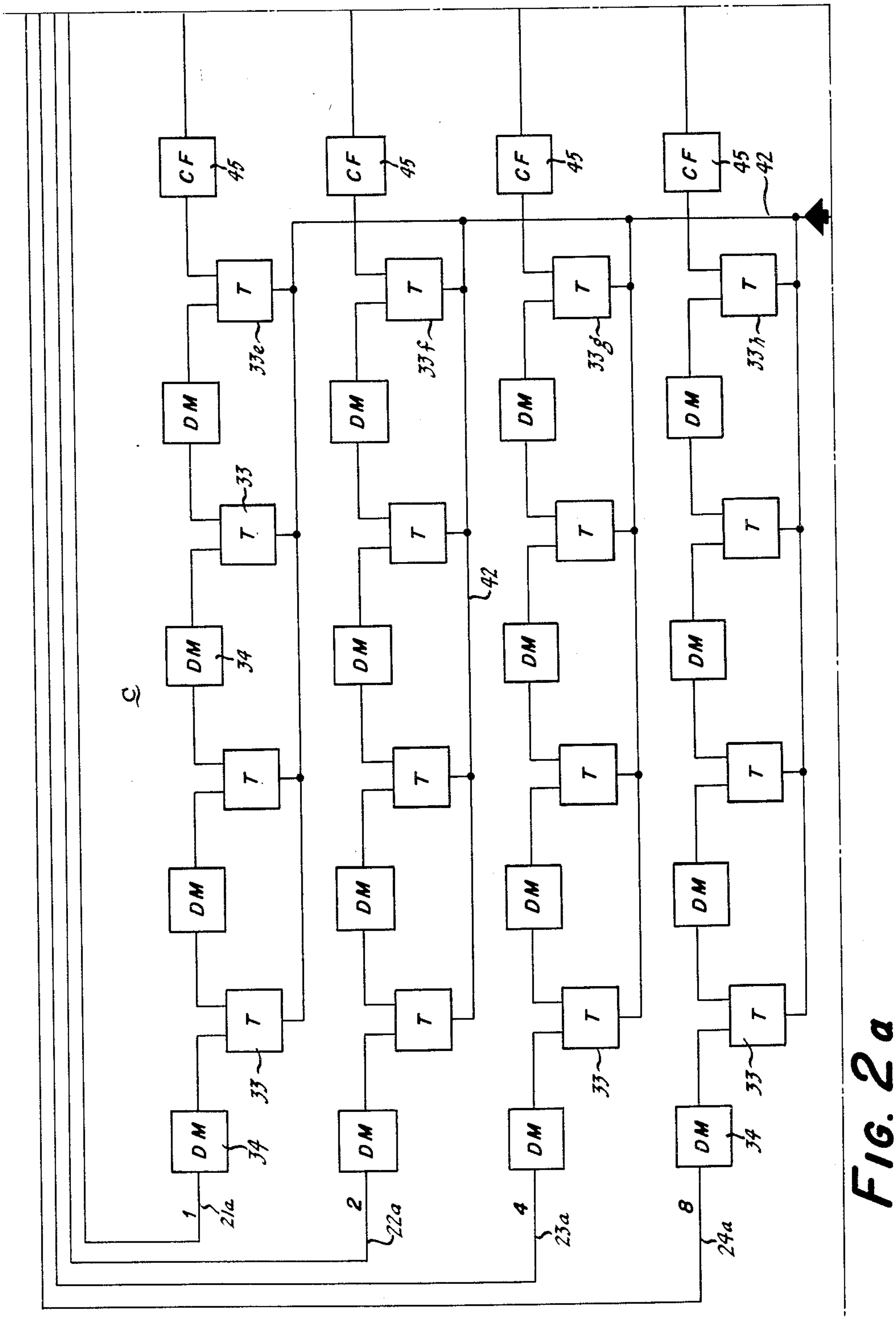
Figure 2B:
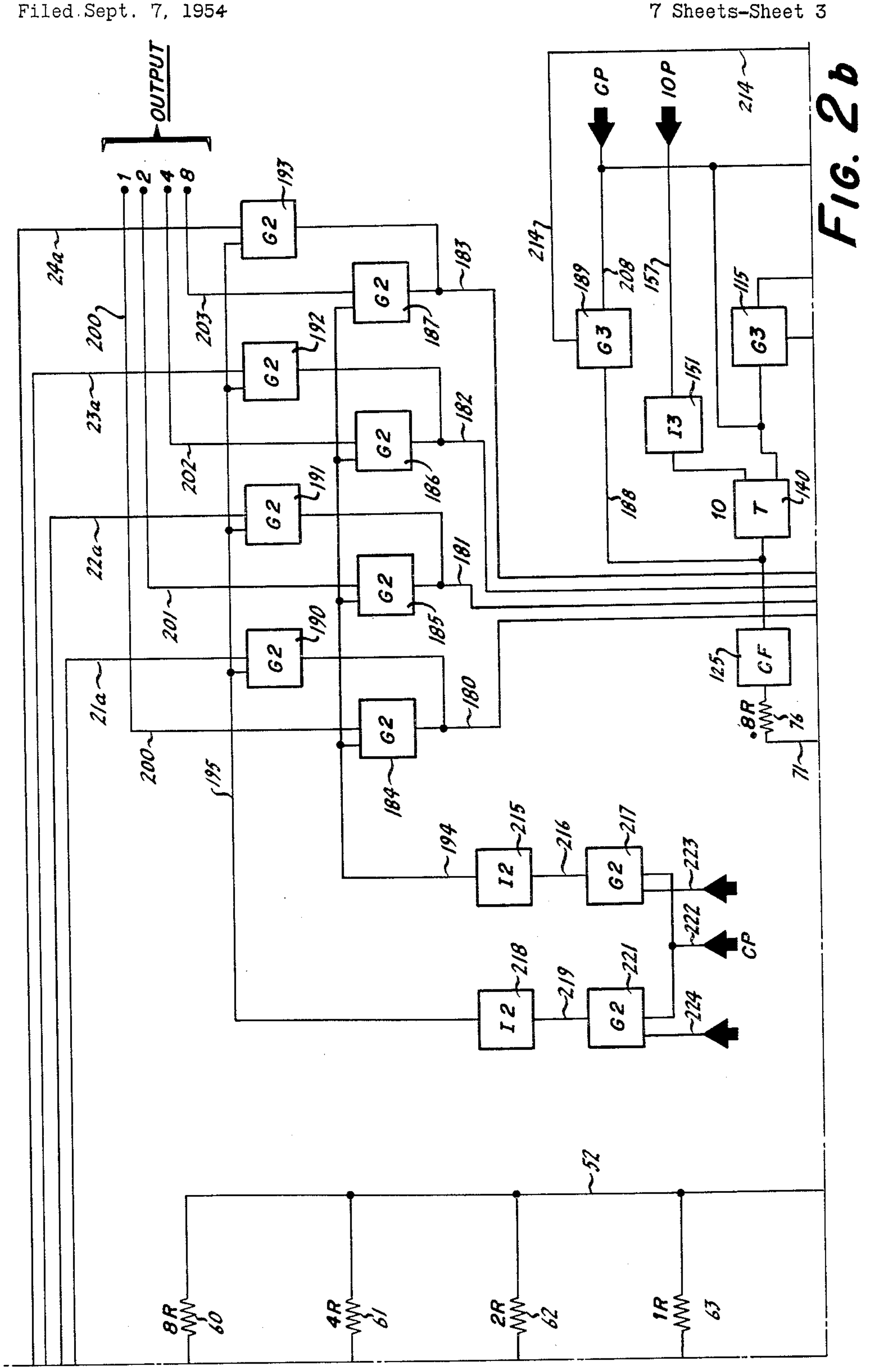
Figure 2C:
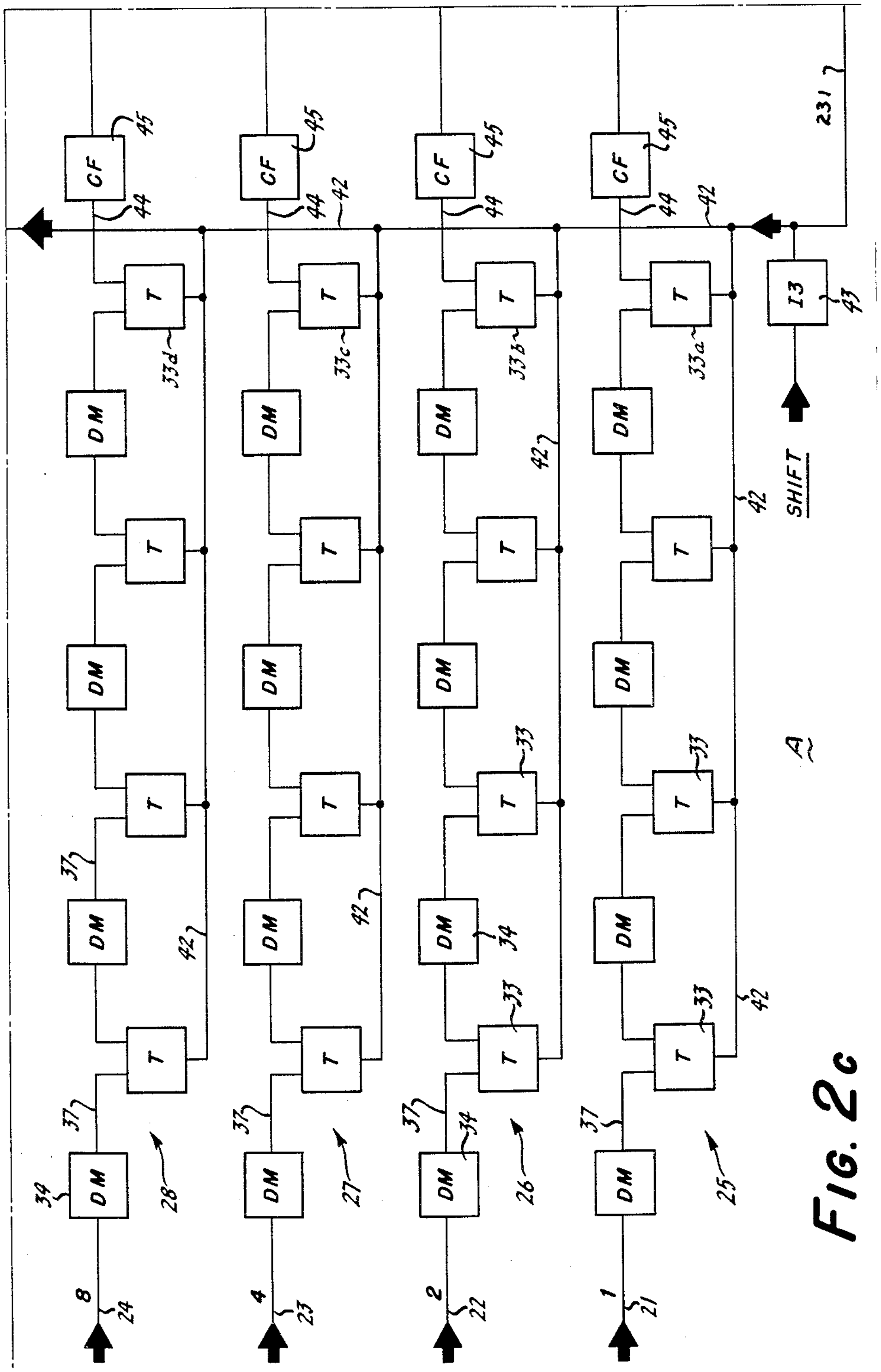
Figure 2D:
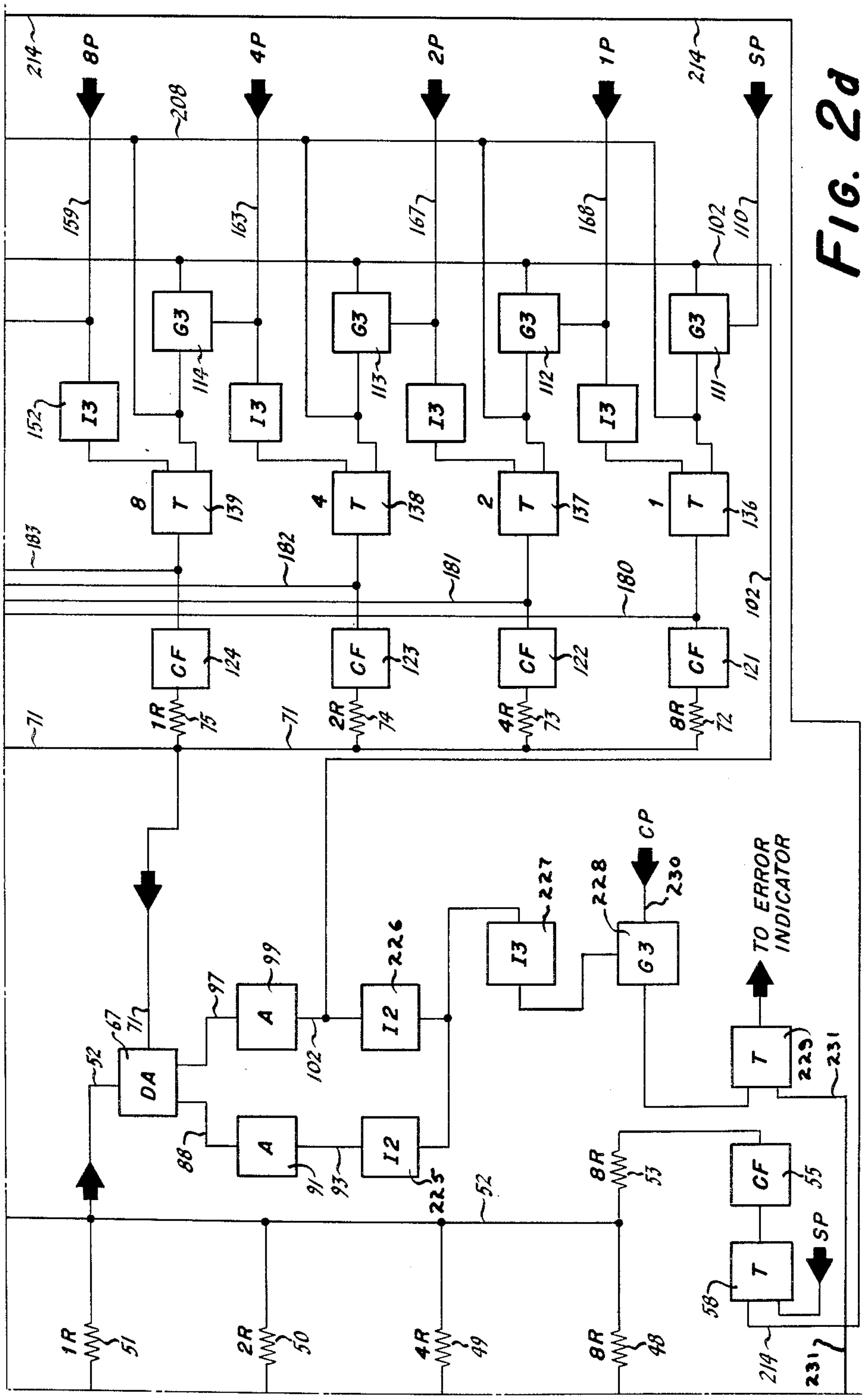

Referring now to FIG. 1, it will be seen that the adder of the invention includes an input register A, disclosed in detail in FIG. 2*c*, an analog adder B, disclosed in detail in FIGS. 2*b* and 2*d*, and an accumulating register C which is disclosed in detail in FIG. 2*a*.

Numbers to be added are successively entered, in the form of binary coded pulses, into the input register through four bit input lines 21 through 24, which lines have binary coded values of 1, 2, 4 and 8, respectively. Each of the augend and the addend is entered, serially by digit and parallelly by bit, through the bit input lines 21 to 24 inclusive into four shift registers 25 through 28 (FIG. 2*c*), respectively. The shift registers disclosed in the present embodiment are well known in the art and will, therefore, be described only briefly. Each comprises four stages, and each stage includes a trigger 33 and a delay multivibrator 34. Binary coded digits are entered into the shift registers 25 through 28 by means of suitable timed voltage impulses impressed upon the lines 21 through 24 each of which is suitably connected to the corresponding multivibrator 34. The trigger 33 and the multivibrator 34, shown in block form in FIG. 2*c* and labeled T and DM respectively, are shown in detail in FIGS. 9 and 7, respectively.

Figure 9:
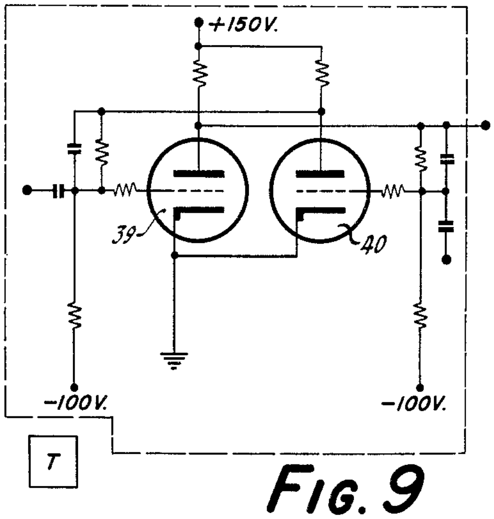
Figure 10:
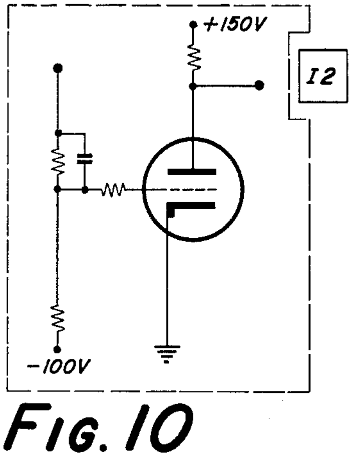

Each multivibrator 34 (FIG. 7) is of the single shot variety and comprises two tubes 35 and 36, the tube 36 thereof being arranged normally to conduct. When, however, a negative-going bit pulse is applied to the control grid of the tube 36 through the associated line 21 through 24, the multivibrator fires and the plate of the tube 36 rises in potential, since that tube is then cut off, for a period of time determined by the time constant of the multivibrator. The plate of each tube 36 is coupled through a line 37 (FIG. 2*c*) to the control grid of one tube 39 (FIG. 9) of the next following trigger 33. Each of the triggers 33 includes the tube 39 and a tube 40 and is arranged in such a way that the tube 39 is normally conducting. (Throughout the description, any trigger will be referred to as On when the left-hand tube thereof, as viewed in FIG. 9, is conducting, and as Off when the opposite condition prevails.) At the end of the period of a fired multivibrator 34, it will be understood that the trailing, negative-going edge of the positive pulse taken from the plate of the tube 36 thereof cuts off the next succeeding trigger tube 39 and thereby turns the associated trigger 33 Off.

Figure 11:
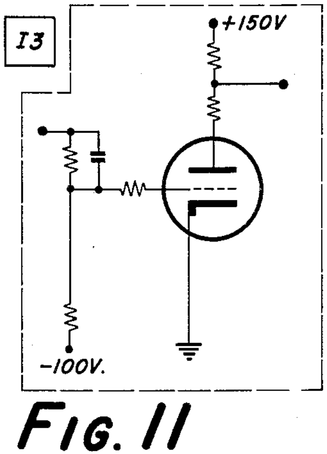

The control grid of each trigger tube 40 is coupled to a line 42 (FIG. 2*c*) which in turn is connected through an inverter 43, labeled I3 and disclosed in detail in FIG. 11, to a source of positive-going shift pulses, and when a shift pulse is applied through the line 42 to these grids, all Off triggers are turned On. The plate of each of the first three trigger tubes 39 in each shift register is coupled to the control grid of the next following multivibrator tube 36, the plate of each fourth trigger tube 39 in each shift register being connected through a line 44 (FIG. 2*c*) to the control grid of a cathode follower 45 which is labeled CF and is shown in detail in FIG. 3. All of the triggers 33 are initially On. It has been shown that a negative bit pulse on one or more of the lines 21 through 24 fires the associated delay multivibrators 34 and, accordingly, the trailing, negative-going edges of the resulting pulses are adapted to turn Off the next following triggers 33. Upon receipt of a shift pulse, each Off trigger is turned On and, as a result, the plate of the trigger tube 39 drops in potential, thereby firing the next following multivibrator 34. Thus, a bit entered into one stage of one of the shift registers is transferred to the next succeeding stage by each shift pulse until it is registered in the fourth stage. At this time, it will be noted that the plate (FIG. 9) of the trigger tube 39 is high if there is a bit stored therein, and thus that the cathode of the associated cathode follower 45 is high, since the plate of the tube 39 is connected to the control grid of the cathode follower 45. Similarly, if no bit is present in the last stage of a shift register, the cathode of the corresponding cathode follower 45 is low.

The cathodes of each of the cathode followers 45 of the input register A are connected by resistors 48 to 51 inclusive (FIG. 2*d*) to a common line 52. The resistors 48 through 51 comprise a portion of the analog voltage adding network utilized herein, and, assuming that the resistor 51 has a value of R, the resistor 50 has a value of 2R, the resistor 49 has a value of 4R, and the resistor 48 has a value of 8R. Additionally, it will be noted that a resistor 53, having a value of 8R, is connected between the line 52 and a cathode of another cathode follower 55, the control grid of which is connected to the plate of a trigger tube 39 of another trigger 58. The trigger 58 is provided to supply a carry digit, when necessary, as will be explained later herein.

The accumulating register C (FIG. 2*a*) is substantially identical to the input register and is distinguished therefrom only by the fact that the input is received from the output of the analog adder B (FIGS. 2*b* and 2*d*), the lines 21*a* through 24*a* being the bit input lines therefor. The cathodes of each of the cathode followers 45 of the accumulating register are connected across a resistor network, comprising four resistors 60 through 63 (FIG. 2*b*), to the line 52, the resistor 63 having a value of R, the resistor 62 having a value of 2R, the resistor 61 having a value of 4R, and the resistor 60 having a value of 8R.

When one of the triggers 33 immediately preceding a cathode follower 45 is On, the grid of the associated cathode follower is low, and in the present embodiment the cathode of the cathode follower is arranged to lie at a potential in the neighborhood of 50 volts. When, however, the trigger 33 is Off, the cathode of the cathode follower 45 is at a potential in the neighborhood of 150 volts. It will be understood that the potential of the line 52 is directly controlled by the condition of stability of the last trigger 33 of each shift register and, due to the prearranged binary coded values of the resistors 53, 48 through 51 and 60 through 63, the potential of the line 52 is directly proportional to the sum of the digits stored in the carry trigger 58 and in the final stages of the various shift registers. It will be clear that, when the final stage of each of the shift registers is On and when the trigger 58 is also On, i.e., when there is no carry digit stored in the trigger 58 and when the two digits stored in the final stages of each of the input and the accumulating registers are each equal to zero, the potential of the line 52 is equal to 50 volts, but when, for example, the last trigger of each of the registers is Off and the carry trigger 58 is Off, i.e., when the digits stored in the final stages of the two registers plus the carry digit total 31, the potential of the line 52 is equal to 150 volts. The relationship involved herein is linear and all numbers intermediately of 0 and 31 are represented by analog potentials which are linearly arranged between 50 volts and 150 volts. Assuming that the sum of the numbers stored in the triggers is equal to a number *n*, it will be understood that the potential of the line 52 is equal to $$\frac{n}{31}\times 100+50$$

and is the analog of the sum.

Figure 4:
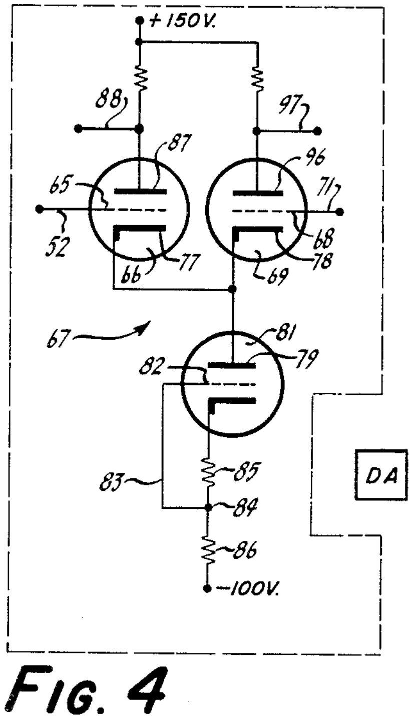

It should now be obvious that the digits being added at any time are represented by a potential on the line 52 which is the analog of their sum, the actual addition being accomplished by the various aforementioned resistors. The remaining structure to be described is provided to convert the analog potential of the sum into a digital value. Conversion is accomplished by comparison, i.e., by comparing known voltages corresponding to digital values with the analog voltage of the sum until the proper digital value is determined. For this purpose, a differential amplifier 67 (FIG. 2*d*), labeled DA and disclosed in detail in FIG. 4 is provided. The line 52 (FIG. 4) is connected to the control grid 65 of a tube 66 which forms a portion of the differential amplifier 67, thereby impressing the potential of the line 52 on the grid 65. The control grid 68 of another tube 69 of the differential amplifier is connected to a line 71 which in turn is connected to one side of each of five voltage adding resistors 72 through 76 (FIGS. 2*b* and 2*d*). The above mentioned known comparing voltages which correspond to the known digital values are developed across these resistors, as will become clear, and are thus impressed upon the control grid of the tube 69. The differential amplifier is arranged to detect a difference between the voltages on the grids 65 and 68.

The cathodes 77 and 78 (FIG. 4) of the tubes 66 and 69, respectively, are common and are each connected to the plate 79 of a tube 81, the control grid 82 of which is connected through a line 83 to a point 84 intermediately of two load resistors 85 and 86 provided in the cathode circuit of the tube 81. The resistor 86 is returned to −100 volts, and it will be understood that the tube 81 is adapted to provide a substantially constant current to the cathodes of the differential amplifier 67. Thus, when there is a difference in potential between the grids 65 and 68 of tubes 66 and 69, respectively, the difference will be reflected in the difference in the plate potentials of these tubes.

Figure 5:
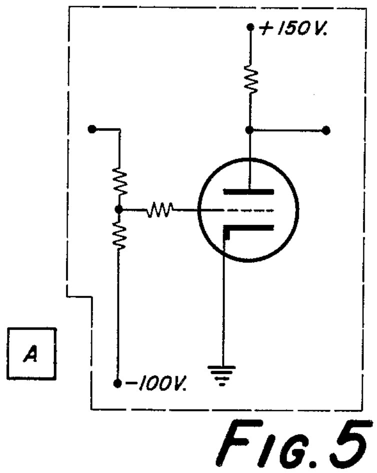
Figure 6:
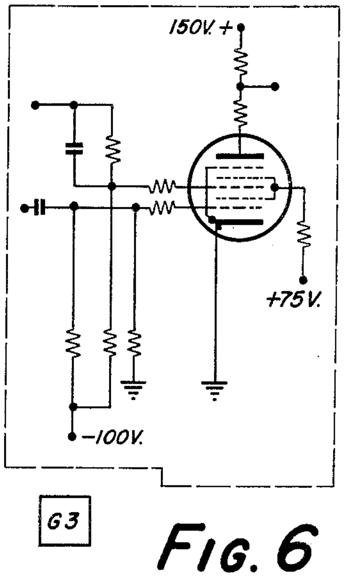
Figure 7:
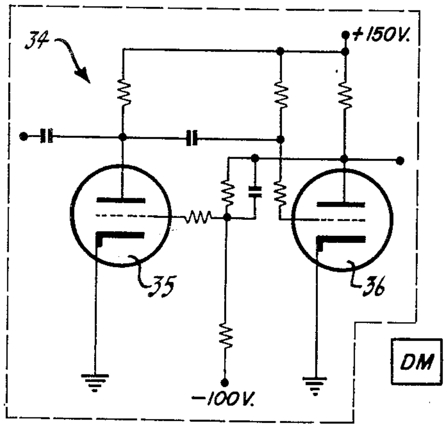
Figure 8:
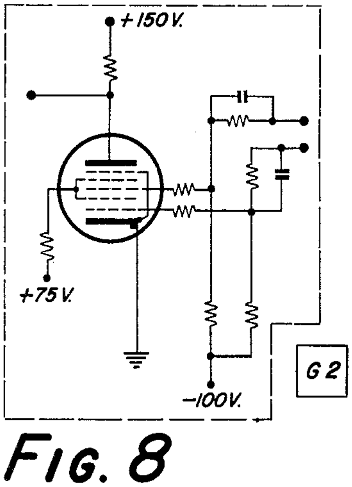

The plates 87 and 96 of tubes 66 and 69 are connected through lines 88 and 97, respectively, to the control grids of two amplifiers 91 and 99 (FIG. 2*d*), respectively, labeled A and disclosed in detail in FIG. 5. The circuit constants of these amplifiers and of the differential amplifier 67 are such that, when the potentials on the grids 65 and 68 are equal, the amplifiers 91 and 99 are biased to conduct, and, under these conditions, the plates of the amplifiers are at low potential, in the neighborhood of 50 volts. When, however, there is a difference in the potentials of the grids 65 and 68 of the differential amplifier 67, a difference of 1 or 2 volts or more, a greater percentage of the total current flowing through the tube 81 flows through the tube 66 or 69 corresponding to the grid 65 or 68 which is higher in potential. It will be seen that in this way the plate of the tube 66 or 69 which carries the most current will drop in potential, the plate of the other tube being arranged to rise. The amplifiers 91 and 99 are biased in such a way that a small decrease in grid potential will render them cut off, thereby raising the plate voltage thereof to around 150 volts. Thus, when the potential of the line 52 exceeds the potential of the line 71, for example, a line 93 connected to the plate of the amplifier 91 is at 150 volts and a line 102 connected to the plate of the amplifier tube 99 is at 50 volts. But when the opposite condition exists, i.e., when the potential of the line 71 exceeds the potential of the line 52, the line 102 is at 150 volts and the line 93 is at 50 volts. It will be understood that the differential amplifier is made sufficiently sensitive to detect a voltage differential of around 1 or 2 volts since, in the present embodiment, voltage increments of around 3 volts, i.e.

$$\frac{100}{31}$$

are utilized. Such sensitivity is easily obtainable, as is well known to those familiar with differential amplifiers such as the one described.

As noted above, the known comparing voltage is developed across the adding resistors 72 through 76 (FIGS. 2*b* and 2*d*), one side of each of which is common and is connected to the line 71. The other side of each of these adding resistors is connected to the cathode of an associated cathode follower (CF), cathode followers 121 through 125 being provided for this purpose. The resistors 72 through 76 have binary coded values of 8R, 4R, 2R, R and .8R, respectively, and, as in the case with the adding resistors previously described, the potential of the line 71 is determined by the cathode potentials of the various aforementioned cathode followers 121 through 125.

The grid potential, and thus the cathode potential, of each of cathode followers 121 through 125 is controlled by a corresponding trigger 136 through 140, each said trigger being substantially identical to the one shown in FIG. 9, and the plate of each trigger tube 39 being connected to the control grid of the associated cathode follower. Each of the triggers 136 through 140 is normally On, i.e., with the tube 39 thereof conducting, thereby maintaining the cathode potential of the associated cathode follower low, around 50 volts. When one or more of these triggers are turned Off, the cathodes of the associated cathode followers rise to 150 volts and the potential of the line 71 rises according to the particular triggers turned Off.

Means, not shown, are provided to create timed positive pulses for controlling the triggers 136 through 140, as well as other structure, these pulses being termed 10P, 8P, 4P, 2P, 1P, SP, CP and shift, and arranged to occur in the timed sequence indicated in FIG. 12. The 10P pulse is fed through a line 157 and through an inverter 151 to the control grid of the trigger tube 39 of the trigger 140; the 8P pulse is fed through a line 159 and an inverter 152 to the control grid of the trigger tube 39 of the trigger 139, the 4P, 2P and 1P pulses being fed to the control grids of the corresponding triggers in a similar manner, as indicated in FIG. 2*d*. It will be understood, therefore, that the triggers 140 through 136 are turned off sequentially by the pulses 10P, 8P, 4P, 2P and 1P, respectively, in that order.

It will be recalled that the line 102 (FIG. 2*d*) is high when the line 71 is at a higher potential than the line 52. The line 102 is connected to the #3 grid of each of five gate tubes 111 through 115, each of which is identical to the other and is designated G3 in the drawing and one of which is disclosed in detail in FIG. 6. When the line 102 is high, the gates 111 through 115 are open, but when line 102 is low, these gates are closed. The plates of the gates 111 through 115 are connected to the control grid of the trigger tube 40 of the corresponding trigger 136 through 140, the #1 grid of each gate being connected to the pulse line associated with the next order trigger, i.e., the #1 grid of the gate 115 being connected to the 8P line 159, the #1 grid of the gate 114 being connected to the 4P line 163, etc., the #1 grid of the gate 111 being connected to the SP line 110.

The trigger 140 is the "10" trigger, and when a positive 10P pulse is fed through the line 157 and through the inverter 151 to the trigger 140, it is turned Off and the line 71 is raised to a potential which is the analog of 10. As noted above, the line 102 is high, thus maintaining the gates 111 through 115 open, when the potential of the line 71 is higher than the potential of the line 52, i.e., when the analog potential of the sum of the digits being added is less than the known comparison voltage. Conversely, when the analog potential of the sum of the digits being added is more than the known comparison voltage, the gates 111 through 115 are closed. The next pulse, the 8P pulse, is arranged to turn Off the "8" trigger 139. Additionally, if the gate 115 is open, the 8P pulse turns On the "10" trigger 140. Thus, when the sum of the digits being added is less than 10, the 8P pulse turns On the "10" trigger 140 at the same time it turns Off the "8" trigger 139. If the sum of the digits being added is greater than 10, it will be clear that the trigger 140 remains Off. Each of the 4P, 2P and 1P pulses is similarly adapted to turn On the preceding trigger 139, 138 and 137, respectively, when the gates 111 through 115 are open, the SP pulse being arranged to turn On the trigger 136 when the aforementioned gates are open.

In addition to being connected to the control grid of the cathode followers 122 through 125, the plates of each of the trigger tubes 39 of the triggers 136 through 139 are connected by lines 180 through 183 to the control grid of a corresponding gate tube 184 through 187, respectively, the plate of the trigger tube 39 of the trigger 140 being connected through a line 188 to the #3 grid of a gate tube 189. The lines 180 through 183 are also connected to the control grids of four gate tubes 190 through 193, respectively. The #3 grids of each of the gates 184 through 187 are connected to a common line 194, the #3 grids of the gates 190 through 193 being connected to a common line 195, and it will be understood that the gates 184 through 187 are open when the line 194 is up, the gates 190 through 193 being open when the line 195 is up. Conversely, these gates are closed when the lines 194 and 195 are down. The plates of the four gate tubes 184 through 187 are connected to four output lines 200 through 203, respectively and the plates of the four gate tubes 190 through 193 are connected to the four lines **21*a* through 24*a***, respectively, which are connected to the input stages of each of the four shift registers of the accumulating register, as noted above.

The line 194 is connected to the plate of an inverter tube 215, the grid of which is connected by a line 216 to the plate of a gate tube 217. Similarly, the line 195 is connected to the plate of an inverter tube 218, the grid of the inverter being connected by a line 219 to the plate of another gate tube 221. The #3 grids of the gate tubes 217 and 221 are connected to a common line 222, and the line 222 is, in turn, connected to the source of CP pulses. Connected to the #1 grids of the gates 217 and 221 are lines 223 and 224, respectively, the potential of which is controlled in any convenient manner to allow selective control of the gates 217 and 221, for a purpose to become clear later herein.

The control grid of the gate tube 189 is connected, through a line 208, to the source of CP pulses, the line 208 being additionally connected to the control grid of each of the five trigger tubes 40 of the triggers 136 through 140, and it should be clear that the trailing edge of the CP pulse turns the triggers 136 through 140 On if they are Off. Also, if the trigger 140 is Off, the gate 189 is open, and a positive-going CP pulse on the line 208 at this time drives the plate of the gate 189 negative. A line 214 is connected betwen the plate of the gate 189 and the control grid of the trigger tube 40 of the trigger 58 (FIG. 2*d*), and when the line 214 drops in potential, the trigger, if Off, is turned On, thereby adding the carry voltage to the line 52 for the next cycle of addition, as will become clear.

Means have been provided for detecting possible error, and for this purpose two inverter tubes 225 and 226, labeled I2, an inverter tube 227, labeled I3, a gate tube 228, labeled G3, and a trigger 229, labeled T, have been provided. The control grids of the inverters 225 and 226 are connected to the plates of the amplifiers 91 and 99, respectively, the plates of these inverters being common and connected to the control grid of the inverter 227. The plate of the inverter 227 is connected to the #3 grid of the gate 228, the plate of which is connected to the control grid of the trigger tube 39 of the trigger 229. It should also be noted that a line 230, connected at one end to the source of CP pulses, is connected to the control grid of the gate 228, and a line 231, connected at one end to the plate of the inverter 43 (FIG. 2*c*), is connected to the control grid of the trigger tube 40 of the trigger 229. It will be recalled that, when the potential of the line 71 is equal to the potential of the line 52, the sum of the digits being added is correctly stored in the triggers 136 through 140, and that at this time the potentials of the plates of the amplifiers 91 and 99 are low. It is only when both of these plates are low that the correct sum is registered in the triggers 136 through 140, and at this time the #3 grid of the gate 228 is low, thereby maintaining it closed, and the plate thereof at a high potential. When, however, one or both of the plates of the amplifiers 91 and 99 are high, the gate 228 is opened, and it will be understood that a positive CP pulse causes the plate thereof to drop, thereby turning the trigger 229 off. Since the CP pulse controls readout, it is clear that an incorrect sum will be detected if the trigger 229 is off after the CP pulse is generated. As will be understood, the trigger 229 may be utilized in various well known ways to operate a suitable indicator or other control apparatus. The shift pulse is arranged to reset the trigger 229 after readout since, when generated, the tube 40 of the trigger 229 is cut off thereby.

In operation, numbers to be added are entered into the input register, serially by digit and parallelly by bit, through the four bit input lines 21 through 24, the bit pulses being entered in timed relation with the shift pulses. In the present embodiment, each number is limited to four digits. Assuming that the first digit, i.e., the least significant digit, of the augend is entered in the input register upon occurrence of the first shift pulse, the fourth or highest order digit is entered upon occurrence of the fourth shift pulse, and at this time it will be understood that the augend is stored in the input register, the least significant digit thereof being stored in the last stages of the input register. It is also assumed, for the purpose of this description, that the accumulating register is empty at this time (it should be clear that any register may be emptied by providing a series of shift pulses in the absence of bit pulses), and that the potential of the line 52 is at a value which is the analog of the least significant digit of the augend. Assuming this digit to be a 9, for example, it will be recalled that the occurrence of the 10P pulse turns Off the "10" trigger 140 and that, as a result, the voltage of the line 71 is raised to a potential which is the analog of 10, which potential is higher than the potential of the line 52, the line 52 being at a potential which is the analog of 9.

Under these circumstances, as noted above, the various gates 111 through 115 are open, and upon occurrence of the 8P pulse the "10" trigger 140 is turned On, the 8P pulse being adapted additionally to turn Off the "8" trigger 139 and thereby lower the potential of the line 71 to a potential which is the analog of 8. When the potential of the line 52 is equal to or more than the potential of the line 71, the gates 111 through 115 are maintained closed, it being only when the line 71 is higher than the line 52 that the gates are open. Thus, when the "8" trigger 139 is turned Off, it remains Off since the gate 114 is closed when the 4P pulse is generated, the 4P pulse being limited, therefore, to turning Off the "4" trigger 138. The 2P pulse, next generated, turns On the "4" trigger 138, the gate 113 being open since the line 71 is higher than the line 52, and also turns Off the "2" trigger 137. The next pulse, the 1P pulse, turns On the "2" trigger, since line 71 is still above the line 52, and turns Off the "1" trigger 136, thereby rendering the potential of the line 71 equal to the potential of the line 52 and closing the gates 111 through 115. Thus, when the SP pulse is generated, the "1" trigger 136 remains Off, and a digit corresponding to the potential of the line 52 is stored in binary form in the five triggers 136 through 140.

In the present example, the triggers 136 and 139 are Off, thereby raising the potential on the control grids of the gate tubes 184, 187, 190 and 193. These gates are normally closed, since the lines 194 and 195 are normally low; however, when it is desired to add or when numbers are to be entered into the accumulating register for addition, control means, not shown, are provided to raise the potential of the line 195 to thereby open the gates 190 through 193. Readout, as will be more fully explained later herein, is obtained by raising the potential of the line 194, thereby opening the gates 184 through 187. Since, in the present example, it is desired to enter the 9 stored in the triggers 136 and 139 into the accumulating register, the aforementioned control means is arranged to raise the potential of the #3 grid of the gate 221, thereby opening it, and when the CP pulse is generated, the line 195 goes up, thereby opening the gates 190 through 193. When the line 195 goes up, the plates of the gates 190 and 193 drop, since the control grids of these tubes are up, and the delay multivibrators 34 (FIG. 2*a*) associated therewith are triggered, thereby entering the 9 into the accumulating register.

Prior to the end of the delay provided by the multivibrator 34, the fifth shift pulse is generated, thereby readying the various trigger stages of the shift registers for receipt of the digits to be entered therein. Before going on with the present illustration, however, it should be noted that the trailing edge of the CP pulse is arranged to turn On each of the triggers 136 through 140, since the grids of the tubes 40 thereof are driven below cutoff, and in this way the triggers are reset immediately after readout therefrom.

Each of the next three shift pulses is arranged, therefore, to enter the second, third and fourth digits of the augend into the accumulating register in a similar manner to that described above in connection with the first or least significant. The four digits of the addend are entered into the input register in timed relation with the shift pulses, the least significant digit thereof being entered upon occurrence of the fifth shift pulse, etc., as described above, and it will be understood that when the least significant digit of the augend is in the final stages of the accumulating register the least significant digit of the addend is in the final stages of the input register. In the present example, since the digit 9 is stored in the final stages of the accumulating register, the final triggers **33*e* and 33*h* are On. If it be assumed that the least significant digit of the addend is equal to 8, i.e., that the trigger 33*d* is also On, the potential of the line 52** is, in this case, equal to approximately $$\frac{9+8}{31}(100)+50$$

or the analog of the sum of 9 and 8, i.e., 17.

As described above, the next pulse, the 10P pulse, turns Off the "10" trigger 140, to thereby raise the potential of the line 71 to the analog of 10, and since line 52 is higher than line 71, thereby leaving the gate 115 closed, the 8P pulse does not turn the trigger 140 On. When the 8P pulse is generated, the "8" trigger 139 is turned Off, and the line 71 is raised to the analog of 18, which is above the line 52, thereby opening the gates 111 through 115. The 4P pulse turns the trigger 139 On and turns the trigger 138 Off. Again, the potential of the line 71 is below the line 52, the potential of the line 71 being the analog of 14, and the gates 111 through 115 are closed. Similarly, triggers 137 and 136 are turned Off by the 2P and 1P pulses, and remain Off, to thereby place the potential of the line 71 at the analog of 17. Thus, after generation of the SP pulse, triggers 140, 138, 137 and 136 are Off. Additionally, since the trigger 140 is Off, the gate 189 is open.

Since at this time readout of the sum of the augend and the addend is desired, the potential of the line 223 is raised to open the gate 217. The lines 180 through 183 corresponding to the triggers 137 through 140 which are Off, in this case the lines 182, 181 and 180, are high, thereby opening the gates 184 through 186, and when the CP pulse is generated, the plates of these gates drop for the duration of the CP pulse. It will be understoood that the sum of these digits, less the carry, i.e., 9+8—10, may be taken from the output lines 200 through 203, in binary coded form, as negative pulses. As before, the trailing edge of the CP pulse turns On the triggers 136 through 140.

As mentioned above, the gate 189 is open when the "10" trigger 140 is Off, i.e., when there is a carry, and when the CP pulse is applied to the control grid of the gate 189, the plate thereof drops in potential if the gate is open. In the present example, the gate 189 is open and the CP pulse causes the plate thereof to drop sharply for the duration of the pulse. Since the plate is connected through the line 214 to the grid of the trigger tube 39 of the trigger 58, the trigger 58 is turned Off, thereby entering the carry digit into the trigger to be added to the second lowest order digits of the augend and the addend after the next shift pulse. It should be noted in this connection that the grid of the trigger tube 40 of the carry trigger 58 is connected to the source of SP pulses and therefore that the trailing edge of each SP pulse resets this trigger, immediately prior to the entry of the carry thereinto.

The occurrence of the next shift pulse enters the second lowest order digits of the augend and the addend into the final stages of the registers, and these digits, along with the carry digit, are added in a manner similar to that above described, the sum less any carry being taken from the output lines 200 through 203.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

An adder comprising first, second and third registers, means for entering signals representing digits of an augend, addend and carry into said respective registers, first, second and third means respectively associated with said registers for converting the signal store within into first, second and third analog signals, means for summing said analog signals to provide a sum voltage the amplitude of which is the analog of the sum of said augend, addend and carry stored in said registers, means, including a plurality of triggers, for generating a standard voltage incrementally variable in response to the condition of said triggers, differential amplifier means for comparing said standard voltage with said sum analog voltage to produce signals indicative of equality and inequality, gate means coupled to said differential amplifier means and to said triggers to change the state of said triggers and reduce the standard voltage by equal increments in response to unequal signals from said differential amplifier means and to block further change of state of said triggers in response to an equal signal, a plurality of gates, means connecting one input of said gates to said triggers, means for simultaneously energizing the other input of said gates to produce output signals from those gates connected to triggers in a predetermined state whereby the output signals are indicative of the digital sum of said addend, augend and carry.

References Cited in the file of this patent

UNITED STATES PATENTS

| | | |
|---|---|---|
| 2,428,811 | Rajchman | Oct. 14, 1947 |
| 2,429,227 | Herbst | Oct. 21, 1947 |
| 2,616,965 | Hoeppner | Nov. 4, 1952 |
| 2,641,522 | King | June 9, 1953 |
| 2,657,856 | Edwards | Nov. 3, 1953 |
| 2,689,683 | Gloess | Sept. 21, 1954 |
| 2,729,811 | Gloess | Jan. 3, 1956 |
| 2,749,034 | Williams et al. | June 5, 1956 |
| 2,781,970 | Kaufman | Feb. 19, 1957 |
| 2,784,907 | Williams et al. | Mar. 12, 1957 |
| 2,808,983 | Uttley et al. | Oct. 8, 1957 |
| 2,836,356 | Forrest et al. | May 27, 1958 |

FOREIGN PATENTS

| | | |
|---|---|---|
| 683,882 | Great Britain | Dec. 10, 1952 |
| 685,218 | Great Britain | Dec. 31, 1952 |

OTHER REFERENCES

Bennett and Low: "Step-Switch Converter," "Electronics," November 1953, pages 164–5.